J. B. Wickersham.

Clothes Rack,

No. 1,630. Reissued Mar. 8, 1864.

Witnesses:
Thos. Geo. Hanecl
Chas. H. Smith

Inventor:
John B. Wickersham

UNITED STATES PATENT OFFICE.

JOHN B. WICKERSHAM, OF NEW YORK, N. Y.

IMPROVED HAT-STAND AND OTHER CLOTHES-HANGING APPARATUS.

Specification forming part of Letters Patent No. 17,461, dated June 2, 1857; Reissue No. 1,630, dated March 8, 1864.

*To all whom it may concern:*

Be it known that I, JOHN B. WICKERSHAM, of the city, county, and State of New York, have invented, made, and applied to use a certain new and useful Improvement in Hat-Stands and other Clothes-Hanging Apparatus; and I do hereby declare that the following is a full, clear, and exact description of the construction and operation of the same, reference being had to the annexed drawings, making part of this specification, wherein—

Figure 1:
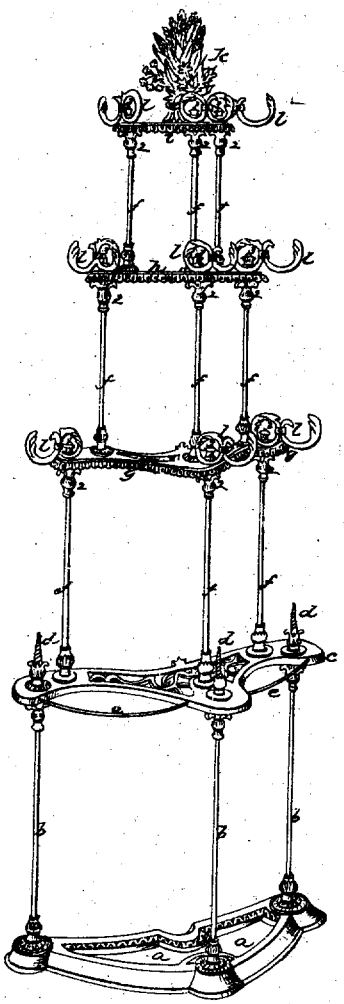
Figure 2:
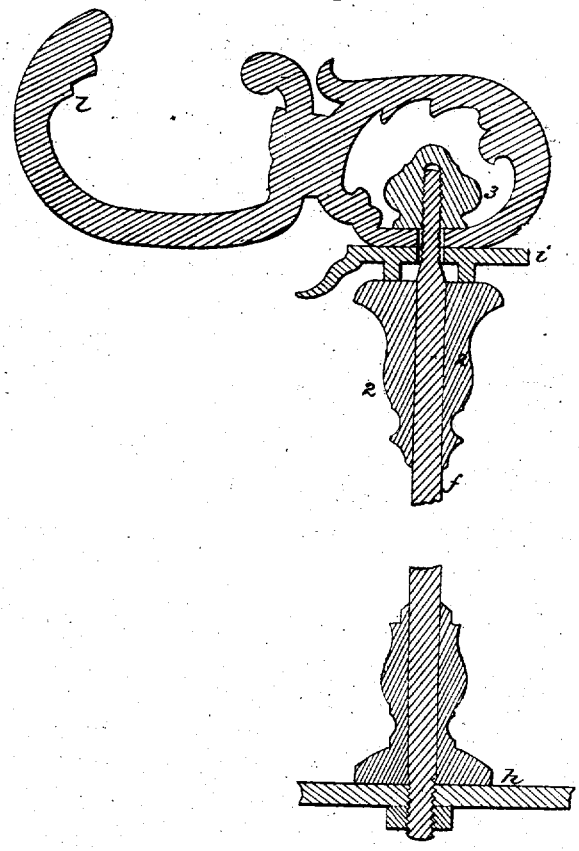

Figure 1 is a perspective view of my hooks as applied to a hat-stand; and Fig. 2 is a vertical section of one of the hooks and its vertical supporting-rod.

Similar marks of reference indicate corresponding parts.

Heretofore the hooks used on hat-stands and other clothes-hanging apparatus have usually been secured by horizontal screws. This mode of attaching the hooks has many disadvantages. First, the weight of the garments on the hooks tends to pull out or break off the screws. Second, the hooks are liable, unless screwed up very tight, to turn around from their proper vertical position, so that the articles put upon them will fall off, thus giving constant trouble and inconvenience to those using the same. Third, the hooks always projecting at right angles from the apparatus necessarily take up a great deal of room, especially in transportation. The hooks cannot be turned around to a position the most convenient for hanging a garment upon, and where there are one or more rows of hooks one above the other the garments in the upper row often interfere with the use of the lower hooks.

The nature of my said invention consists in attaching the hooks of a hat-stand or clothes-hanging apparatus so that said hooks can be turned around horizontally in order that they may be placed in the position desired for hanging clothes upon, and said hooks, being movable in a horizontal direction only, are not liable to become loose and hang downward, as is the case with the clothes-hanging hooks heretofore made use of, in which the attaching device stands horizontally, while my attaching device stands vertically, and allows of the hook being swung or turned around horizontally into any desired position for hanging articles of clothing upon such hooks.

In the drawings a hat-stand is shown with five terraces, but the number may be increased or diminished according to the size of the stand.

*a* is the base or bottom terrace, formed as a pan, for drippings from umbrellas.

*b b b* are vertical tie-rods sustaining the second terrace *c*, and the rod *b b b* are to be provided with cast-metal caps setting under the terrace *c*; or they may pass through ornamental brass tubes or similar devices so that the end of the said rods can be secured by nuts *d d d*, formed in any suitable ornamental style.

*e* is a wire for supporting umbrellas, canes, &c.

*f f f* are a series of tie-rods supporting and connecting the upper terraces, *g h* and *i*, and over the terrace *i* a suitable ornament, *k*, may be attached, and a glass may be hung between the terraces *h* and *i*, if desired.

In Fig. 2 the rod *f* is shown as secured to the lower terrace, *h*, by a nut, 1, at its lower end, and the said rod *f* is to be constructed with the ornamental metallic cap 2 or other shoulder to support the upper terrace, *i*, and the said rod passes vertically through the projecting hook *l*, and said hook thus rests on the terrace *i*, and can be turned around horizontally into any desired position the most convenient to hang the garments or to cause the garments on the hooks of one terrace or row to hang between or clear of those on the terrace below. 3 is a nut on the end of the rod *f* to secure the hook *l* in place, and also serves to connect the hat-stand together. These hooks, when turned around, are not in the way, and by their ability to turn horizontally give great facility in hanging garments, as aforesaid.

The ornamental shape of these hooks may be varied if desired, and they may be attached to a hat-stand or any other suitable support so as to swing horizontally, as aforesaid.

What I claim, and desire to secure by Letters Patent, is—

Attaching the hooks of hat-stands and other clothes-hanging apparatus so that said hooks can be turned around horizontally, substantially as and for the purposes specified.

In witness whereof I have hereunto set my signature this 5th day of February, A. D. 1864.

JOHN B. WICKERSHAM.

Witnesses:

LEMUEL W. SERRELL,
CHAS. H. SMITH.